US005159173A

United States Patent [19]

Frind et al.

[11] Patent Number: 5,159,173

[45] Date of Patent: Oct. 27, 1992

[54] APPARATUS FOR REDUCING PLASMA CONSTRICTION BY INTERMEDIATE INJECTION OF HYDROGEN IN RF PLASMA GUN

[75] Inventors: Gerhard Frind, Altamont; Sudhir D. Savkar, Schenectady, both of N.Y.

[73] Assignee: General Electric Company, Schenectady, N.Y.

[21] Appl. No.: 774,909

[22] Filed: Oct. 11, 1991

Related U.S. Application Data

[62] Division of Ser. No. 588,394, Sep. 26, 1990.

[51] Int. Cl.[5] .......... B23K 9/00

[52] U.S. Cl. .......... 219/121.47; 219/121.52; 219/121.51; 219/76.16; 315/111.51

[58] Field of Search .......... 219/76.16, 121.51, 121.52, 219/121.47, 121.59; 315/111.21, 111.51

[56] References Cited

U.S. PATENT DOCUMENTS

| | | | |
|---|---|---|---|
| 3,296,410 | 1/1967 | Hedger | 219/121.52 |
| 4,147,916 | 4/1979 | Fairbairn | 219/121.47 |
| 4,370,538 | 1/1983 | Browning . | |
| 4,551,609 | 11/1985 | Falk | 219/121.47 |
| 4,766,287 | 8/1988 | Morrisroe et al. | 219/121.52 |
| 4,766,351 | 8/1988 | Hull et al. | 219/121.52 |
| 4,795,879 | 1/1989 | Hull et al. . | |
| 4,805,833 | 2/1989 | Seimers . | |
| 4,818,916 | 4/1989 | Morrisroe . | |
| 4,866,240 | 9/1989 | Webber . | |
| 4,902,870 | 2/1990 | Frind et al. . | |

*Primary Examiner*—Mark H. Paschall
*Attorney, Agent, or Firm*—James E. McGinness; James Magee, Jr.

[57] ABSTRACT

Apparatus and a method for generating an RF plasma plume wherein hydrogen gas is introduced downstream of the means for injecting plasma gas in order to increase the coupling between the RF coil and the plume and to decrease heat loss to the plasma containment walls.

2 Claims, 3 Drawing Sheets

APPARATUS FOR REDUCING PLASMA CONSTRICTION BY INTERMEDIATE INJECTION OF HYDROGEN IN RF PLASMA GUN

BACKGROUND OF THE INVENTION

This invention relates to an improved RF plasma gun and method of producing an RF plasma plume whereby a constriction of the plasma plume due to the introduction of hydrogen in such guns is reduced while also reducing heat losses from the plasma plume to a powder injection probe in the gun.

Radio frequency (RF) plasma deposition is a plasma spray process which is well known for producing high temperature gaseous plasma. The devices for generating the plasma are sometimes referred to as plasma guns. They find utility in diverse heating applications such as high temperature chemical reactions, heating of solid targets, melting of particles such as a superalloy and for providing surface coatings and spray processes. Plasma processes are also used to produce low interstitial content titanium, refractory metal, and superalloy deposits. In addition, the deposition efficiency of materials sprayed by the RF plasma process can approach 100%.

RF plasma deposition is a plasma spray process which can be used to fabricate low interstitial content titanium, refractory metal, and superalloy deposits. For example, U.S. Pat. No. 4,805,833, the disclosure of which is incorporated herein by reference, describes an RF plasma apparatus, including an RF plasma gun and the operation thereof in a frequency range of from 2 to 5 megahertz. The plasma is produced by induced RF energy which causes gases flowing in the interior of the gun to form a plasma plume or jet which flows to the adjacent substrate. Gases introduced into the plasma gun to form the plasma are herein referred to as "plasma gas." Typical plasma gas is comprised of argon, nitrogen, helium, or mixtures thereof.

Small quantities of hydrogen can be employed in the plasma gas to enhance heat transfer. Hydrogen has a low dissociation temperature, and the latent heat of dissociation of hydrogen increases the enthalpy of the resulting plasma. However, largely as a consequence of the large increase in thermal conductivity of hydrogen through dissociation at about 3000 to 4000K, the plasma plume generated in such guns suffers from a constriction effect shown graphically in FIG. 1 (Sides A&B) which illustrates the typical temperature distribution in a plasma gas having added hydrogen and a non-dissociating (non-molecular) gas such as argon. Because of the constriction effect, coupling is weakened between the plasma and the electromagnetic field from the induction coil in the gun. This puts a limit on the mole fraction of hydrogen which can be introduced in the gun. Further, the increased thermal conductivity resulting from the dissociation of hydrogen increases heat losses to the powder injection probe.

The above described constriction of the plasma plume from the introduction of hydrogen gas to the plasma is herein referred to as "discharge constriction".

SUMMARY OF THE INVENTION

It is an object of this invention to minimize the effects of discharge constriction and heat loss from the plasma plume due to the introduction of hydrogen in RF plasma guns while at the same time maintaining appropriate heat transfer to the powder being heated and melted.

In known RF plasma guns, plasma gas is introduced at one end of the plasma chamber and passes through an electromagnetic field created by a power coil, heating the plasma gas by induction to form a plasma plume. An appropriate powder to be heated, in particulate form, is introduced to the plasma through a powder injection probe. Typically, hydrogen is introduced simultaneously with the plasma gas at one end of the plasma chamber in order to increase heat transfer to the powder.

According to the present invention, hydrogen gas is injected at a location downstream from the introduction of the plasma gas in order to reduce the amount of hydrogen in the region where the plasma couples with the RF coil. In this way, the loss of coupling with the RF coil due to the discharge constriction effect of hydrogen is minimized. An additional benefit of this mode of introducing hydrogen is a reduction in heat losses from the plasma to the powder injection probe. In addition, the RF plasma gun is further shielded by the cooler hydrogen gas, there being a protective sheet of hydrogen between the walls of the gun and the plasma core. In other words, the high temperature plasma core is further shielded from heat loss to the RF plasma gun walls from the hydrogen introduced into the RF plasma gun by the method of this invention.

In one aspect of the invention, an RF plasma gun is provided comprising an enclosure defining a chamber for containing a plasma and having a plasma exit port through which the plasma flows, an electrical conductor coil adjacent the enclosure for applying RF energy to a region within the chamber to create the plasma from a plasma gas flowing in the chamber, a first means for the introduction of the plasma gas at an upstream location of the chamber such that the plasma gas will flow in a gas stream through the electromagnetic field generated by the coil, a powder injection means located so as to inject powder into the chamber, and a second means for introducing hydrogen gas through the chamber wall at a location downstream from the first means for the introduction of the plasma gas, such that constriction of the plasma will be reduced and additional heat shielding will be provided for the chamber walls. The hydrogen gas may be injected through the chamber wall at a location between windings of the coil or at some other location downstream from the initial coupling of energy from the coil to the plasma gas.

In another aspect of the invention, a method of producing an RF plasma plume is provided by introducing a plasma gas into a chamber with an exit port, applying RF energy to the chamber by means of an electrical conductor coil to create the plasma from the plasma gas flowing in the chamber, and introducing hydrogen gas through the chamber walls at a location downstream of the introduction of the plasma gas so as to reduce constriction of the plasma.

DETAILED DESCRIPTION OF THE PREFERRED EMBODIMENTS

Figure 2:
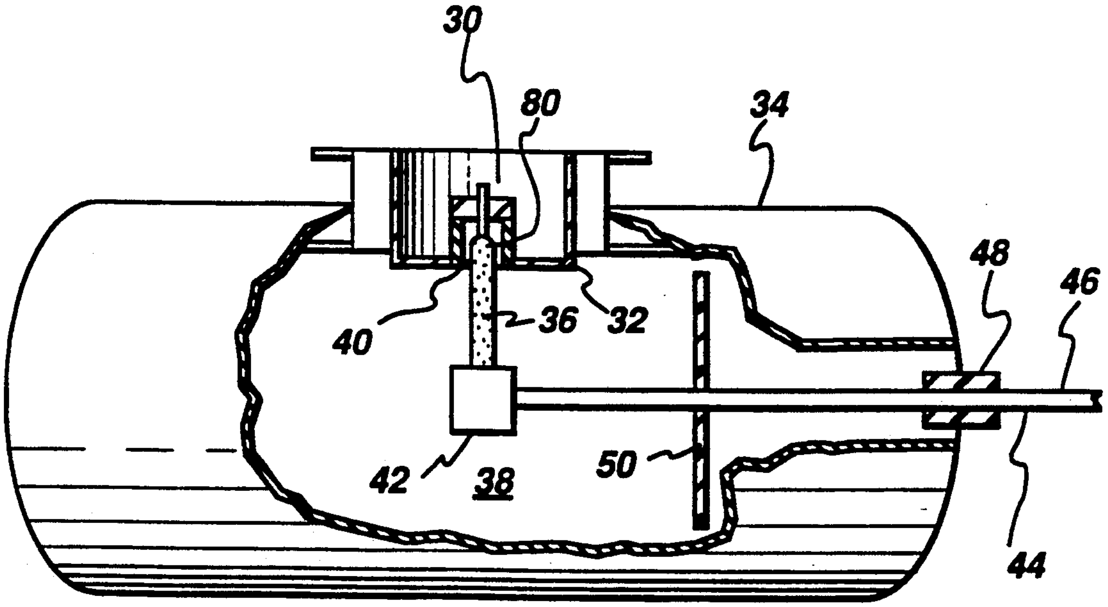
FIG. 2 is a fragmented side elevation view in section of a schematic of an apparatus employing an RF plasma gun in accordance with an embodiment of the present invention.

FIG. 2 illustrates diagrammatically a typical arrangement of an RF plasma heating apparatus, such as an RF spray apparatus for providing a surface coating on a target. The apparatus comprises an RF generating device 30 secured centrally to a plasma device support 32 projecting into tank 34. The RF plasma device 30 is positioned to inject a plasma plume 36 into the interior 38 of the tank 34. The plasma plume 36 passes into the tank through an opening 40 in the support 32. The tank is evacuated as is done in a conventional RF plasma system, e.g., to 250 torr.

The plasma plume 36 heats or otherwise treats the surface of a target 42 within the tank interior 38. The target 42 is carried by a mechanical actuator sometimes referred to as a sting 44. The sting 44 enables the target 42 to be positioned and rotated relative to the plasma plume 36 by an actuator arm 46. In RF spray coating systems, particles of the coating material, such as a superalloy or a ceramic powder, are injected into the plasma stream, melted by the plasma and sprayed by the plasma onto the target to provide a surface coating on the target. Typically, the target 42 includes a substrate to which a deposition of the coating material is to be applied.

Figure 3:
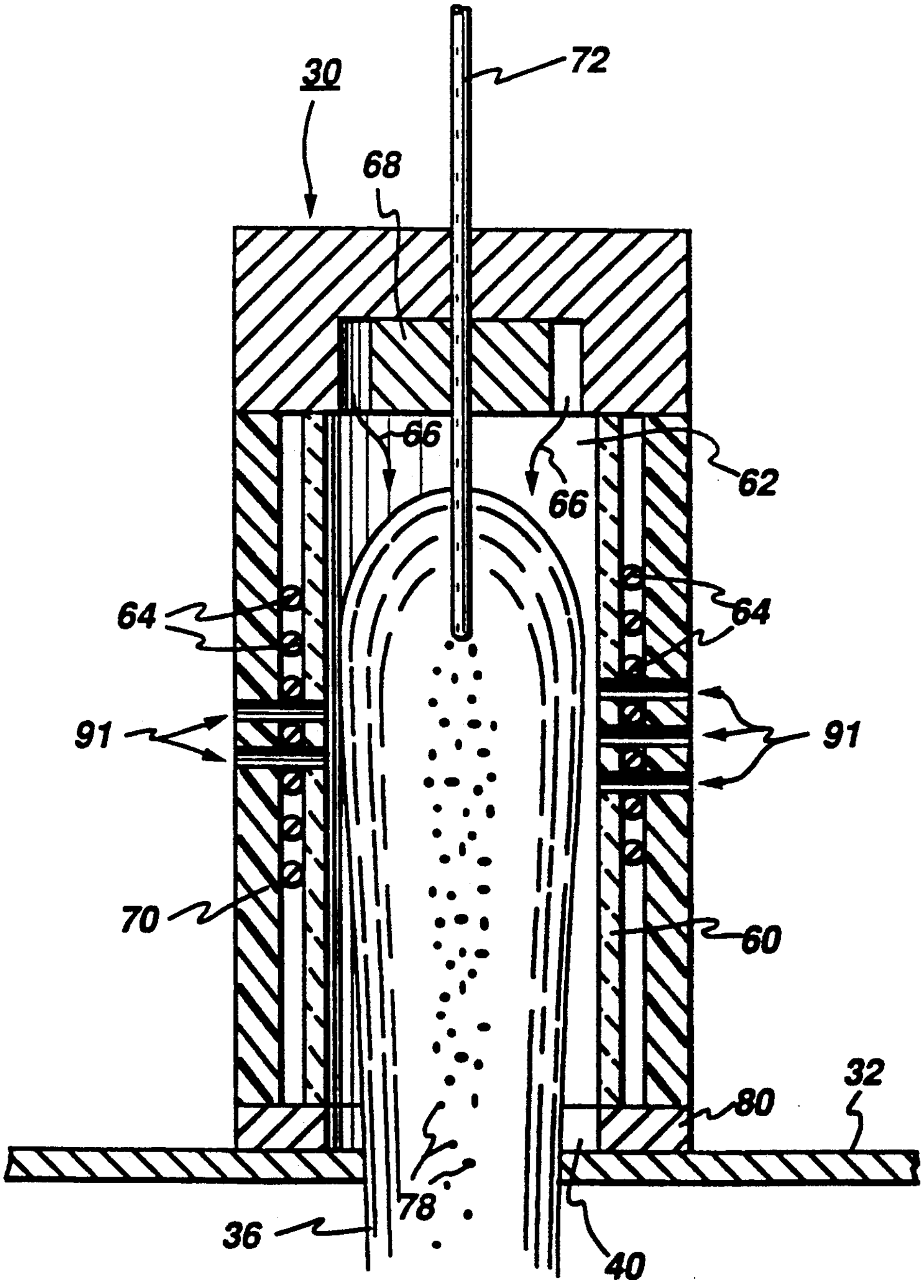
FIG. 3 is a more detailed elevation view in section of the plasma gun of the embodiment of FIG. 2.

The RF plasma device 30 is shown in more detail in FIG. 3, and comprises an electrically insulative dielectric enclosure 60, which typically may be made of quartz forming a cylindrical chamber 62 for the plasma. An electrical induction coil is connected to a source of RF energy (not shown) and surrounds the enclosure 60 for coupling RF energy to an ionizable gas, such as argon, nitrogen or helium, which is injected into the chamber to produce the plasma. An annular ring 68 includes passageways (not shown) in which the ionizable gas mixture enters the plasma chamber 62 as shown by arrows 66. A water cooled particle injection tube 72 (water cooling means not shown) extends axially into the plasma chamber 62 through the annular ring 68.

Figure 1:
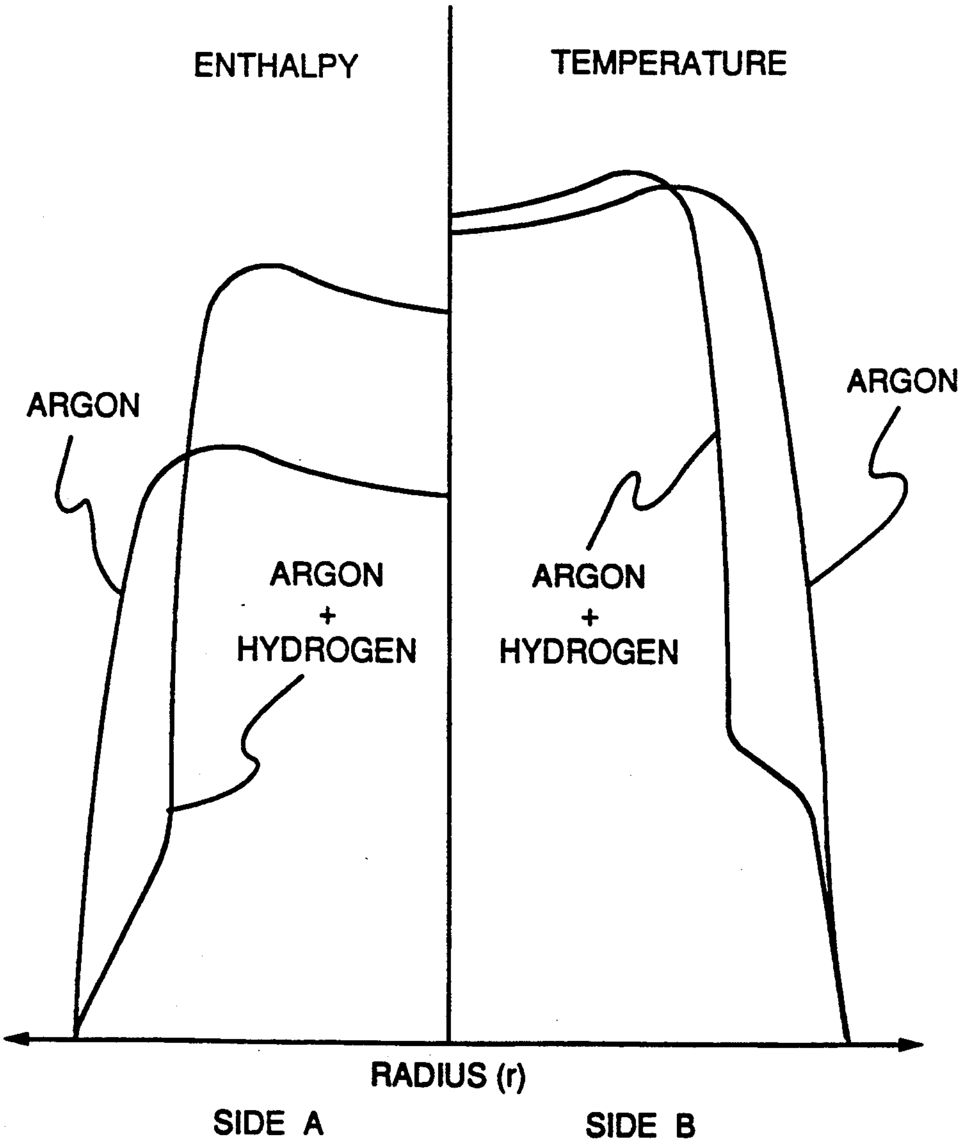
FIG. 1 is a schematic radial distribution of enthalpy on Side A and temperature on Side B in an RF plasma discharge operating with pure argon or with an argon-hydrogen mixture as the plasma gas.

In a typical RF plasma gun, plasma gases are introduced at about the same upstream location 66 illustrated in FIG. 3. Typical plasma gases employed in such guns are argon, nitrogen, helium, or in some cases, various mixtures of these gases. However, the heat transfer characteristics of these gases is limited. Hence, small quantities of hydrogen are either mixed in with the plasma gas or introduced concurrently with plasma gas, as illustrated at 66 in FIG. 3. While this improves the heat transfer to the particles of powder, it also increases the heat losses to the water cooled powder injection probe and the chamber wall containing the plasma. A second effect of the hydrogen is to cause the plasma to constrict as illustrated in FIG. 1. The constriction in the plasma causes the coupling with the RF coil to weaken.

However, in accordance with the present invention the hydrogen gas is injected into the plasma plume at a downstream location, for example intermediate the power coil 64, so that it will diffuse into the plasma and contribute to the improved particle heating without causing constriction of the plasma. In this way, the discharge behaves nearly as if hydrogen were absent and discharge constriction is minimized. An attractive bonus of this approach is the improved protection of the RF gun walls, which are now further shielded by the cooler hydrogen gas. The protective sheet of hydrogen interspersed between the chamber walls of the gun and the plasma core, with its high temperature gradients, will substantially reduce the amount of heat lost to the chamber walls.

As shown in FIG. 3, the hydrogen gas can be introduced through the sides of the chamber as shown by the passageways 91. The passageways can be positioned to introduce the hydrogen into chamber 62, either radially or tangentially to chamber walls 60. A second tubular insulating member 70, which may be made of an insulating material such as carbon tetrafluoroethylene, sold under the trademark Teflon by E. I. DuPont de Nemours and Co., is disposed about the coil 64 and enclosure 60. The coil 64, enclosure 60 and the second tubular insulating member 70 are in general concentric.

The particle injection tube 7 injects metal or ceramic particles 78, for example, a titanium alloy such as Ti-14Al-21Nb, into the plasma 36 so that the particles may be melted and sprayed upon the target 42 (FIG. 2) by the plasma. Not shown are cooling passageways located in various elements of the device 30 and means for supplying cooling water to the device.

The plasma device 30 as described is similar to a commercially available plasma gun manufactured by the TAFA Company with the addition of passageways 91 to introduce hydrogen gas intermediate to the power coil.

What is claimed is:

1. An RF plasma gun comprising:

(a) An enclosure defining a chamber for containing a plasma and having a plasma exit port through which the plasma flows, (b) an electrical conductor coil adjacent the enclosure for applying RF energy to a region within the chamber to create the plasma from a plasma gas flowing in the chamber, (c) a first means for the introduction of the plasma gas at an upstream location of the chamber such that the plasma gas will flow in a gas stream through the electromagnetic filed generated by the coil, (d) a powder injection means located so as to inject powder into the chamber, and (e) a second means for introducing hydrogen gas extending through the enclosure at a location downstream from an end of the coil facing the first means for the introduction of the plasma gas, such that constriction of the plasma will be reduced.

2. An RF plasma gun as recited in claim 1 wherein the second means extends through the enclosure at a location intermediate the coil.

* * * * *